(12) United States Patent
Andree et al.

(10) Patent No.: US 9,070,011 B2
(45) Date of Patent: Jun. 30, 2015

(54) AUTOMATED SEGMENTATION TUNER

(75) Inventors: Fred W. Andree, Brookline, MA (US); Thomas A. Schuneman, Medford, MA (US)

(73) Assignee: CSR Imaging US, LP, Burlington, MA (US)

(*) Notice: Subject to any disclaimer, the term of this patent is extended or adjusted under 35 U.S.C. 154(b) by 257 days.

(21) Appl. No.: 13/163,524

(22) Filed: Jun. 17, 2011

(65) Prior Publication Data

US 2011/0311139 A1    Dec. 22, 2011

Related U.S. Application Data

(60) Provisional application No. 61/356,159, filed on Jun. 18, 2010.

(51) Int. Cl.
| | | |
|---|---|---|
| *G06K 9/34* | (2006.01) | |
| *G06K 9/00* | (2006.01) | |
| *H04N 1/40* | (2006.01) | |

(52) U.S. Cl.
CPC ........ *G06K 9/00456* (2013.01); *G06K 2209/17* (2013.01); *H04N 1/40062* (2013.01)

(58) Field of Classification Search
CPC ............ H04N 1/40062; H04N 1/6072; G06K 9/00456; G06K 9/6269; G06K 9/004693; G06K 99/005; G06K 9/34
USPC .......................................... 382/173–180, 170
See application file for complete search history.

(56) References Cited

U.S. PATENT DOCUMENTS

| | | | |
|---|---|---|---|
| 3,626,381 A * | 12/1971 | Dubinsky et al. ............. | 382/225 |
| 5,765,029 A | 6/1998 | Schweid et al. | |
| 5,883,973 A | 3/1999 | Pascovici et al. | |
| 5,956,468 A * | 9/1999 | Ancin ............................ | 358/1.9 |
| 6,195,459 B1 | 2/2001 | Zhu | |
| 6,266,439 B1 | 7/2001 | Pollard et al. | |
| 6,785,416 B1 | 8/2004 | Yu et al. | |
| 6,839,151 B1 | 1/2005 | Andree et al. | |
| 7,019,761 B2 | 3/2006 | Srinidhi et al. | |
| 7,079,686 B2 | 7/2006 | Ahmed et al. | |
| 7,295,700 B2 | 11/2007 | Schiller et al. | |
| 7,298,903 B2 | 11/2007 | Wang et al. | |
| 7,436,994 B2 | 10/2008 | Huang | |
| 2007/0165950 A1* | 7/2007 | Nishida ......................... | 382/177 |
| 2007/0168305 A1* | 7/2007 | Vapnik et al. .................. | 706/12 |
| 2008/0137954 A1* | 6/2008 | Tang et al. .................... | 382/176 |
| 2009/0089235 A1 | 4/2009 | Torii et al. | |
| 2009/0296110 A1 | 12/2009 | Mestha et al. | |
| 2010/0017354 A1* | 1/2010 | Chan et al. ..................... | 706/47 |

* cited by examiner

*Primary Examiner* — Kim Vu
*Assistant Examiner* — Michael Vanchy, Jr.
(74) *Attorney, Agent, or Firm* — Vorys, Sater, Seymour and Pease LLP; Vincent M DeLuca

(57) ABSTRACT

A system, method, and computer program product are provided for automatically segmenting input document images into regions of black text, white space, and image content. A set of scanned training documents representing the range of text and images to be processed is coarsely tagged to classify regions by content type. The training images are divided into bricks, parameters describing individual brick features are evaluated, and the bricks are classified according to the parameter values. A classification map that relates parameter values to classification codes describing content type is constructed by generating linear equations separating a parameter space into parameter regions along classification boundaries. After training, input documents are scanned and divided into bricks, and brick parameters are converted into an index into the classification map, to classify document regions by content.

17 Claims, 3 Drawing Sheets

FIG. 3

INDEX TO REGION MAP

| | A | ? | ? | ? | B | B | B | C |
|---|---|---|---|---|---|---|---|---|
| | + | − | + | − | + | − | + | − |
| | + | + | − | − | + | + | − | − |
| | + | + | + | + | − | − | − | − |
| | + | + | + | + | + | + | + | + |
| | • | • | • | • | • | • | • | • |

| | ? | ? | ? | ? | ? | B | B | C |
|---|---|---|---|---|---|---|---|---|
| | + | − | + | − | + | − | + | − |
| | + | + | − | − | + | + | + | − |
| | + | + | + | + | − | − | − | − |
| | − | − | − | − | − | − | − | − |
| | • | • | • | • | • | • | • | • |

AUTOMATED SEGMENTATION TUNER

CROSS-REFERENCE TO RELATED APPLICATIONS

This application claims priority under 35 U.S.C. 119(e) from U.S. Provisional Application Ser. No. 61/356,159 entitled "Automated Segmentation Tuner" filed on Jun. 18, 2010, which is expressly incorporated by reference in its entirety.

BACKGROUND OF THE INVENTION

1. Field of the Invention

This application relates in general to image processing and in particular to identifying regions of black text, image, and white space in input images.

2. Discussion of Related Art

Embodiments of the present invention provide a solution for improving image segmentation, which is the process of categorizing the pixels of an input document as white space, black text, and image content. Segmentation can improve document image processing in several ways, essentially because the choice of appropriate image processing algorithm for a particular image region depends on the region's contents. Application of particular algorithms to document image regions containing the wrong content type can actually decrease document image quality.

When performing color copying for example, one can get much higher quality results if one can determine what parts of the original document are white space, black text or black line art, and image content. Text looks better when printed only in black ink or black toner, as there are no colored halos around the edges. In contrast, printed photographs generally look better when all available inks or toner colors are used. There are also performance advantages to printing according to particular algorithms, i.e. if a page or part of a page is black text only, it can often be printed faster. Scanned input may also be compressed more effectively if regions of black text and white space have already been recognized. This application is written in terms of a copy system, though the present invention is not limited to that use.

Segmentation is unfortunately not an easy task. The input document image arriving for processing from the scanner is typically noisy. Scanned text often has color fringes or halos, and may not be very dark. Text also comes in many different fonts and sizes. White areas may have nonwhite speckles from a variety of causes. Images may be screened halftones, photographs, or colored artwork for example, and may need to be further processed accordingly.

At present, typical segmentation tools break the input document image into rectangular blocks, and calculate various parameters for each block. The parameters might include smoothness, color level, average luminance, minimum luminance, and maximum luminance. Some of these parameters may be averaged vertically or in a neighborhood of the block. These aggregated values are additional parameters for the block.

Then a classification by parameter values takes place, which often involves comparing parameter values to thresholds and doing lots of ANDs and ORs to try to assemble a logic function to refine the classification. A secondary algorithm run over the initial classification converts islands of text in an image to image content, and vice versa, and performs similar cleanups. Tuning the thresholds is a time consuming and frustrating job. A set of threshold values is typically chosen by educated guess.

A set of original documents is then run through a segmentation algorithm. A person, the tuner, examines the results of the segmentation algorithm carefully to see where mistakes were made. The tuner then manually determines what threshold values or what logical combination caused the error, a difficult task in itself, and adjusts the threshold or fixes the logic. The tuner then repeats the process. An adjustment that fixes one problem will often create others, unfortunately. The tuner must try to find threshold values and logic that minimize errors over a wide range of documents.

Previous manual and partially-automated segmentation techniques are tedious, time-consuming, and/or inaccurate. There is therefore a need for improved automated document segmentation.

SUMMARY OF THE INVENTION

Disclosed and claimed herein are a device, method, and computer program product for identifying regions of black text, image content, and white space in input document images.

A set of scanned training documents representing the range of text and images to be processed is coarsely tagged to classify regions by content type. The training images are divided into bricks, parameters describing individual brick features are evaluated, and the bricks are classified according to the parameter values. A classification map that relates parameter values to classification codes describing content type is constructed by generating linear equations separating a parameter space into parameter regions along classification boundaries. After training, input documents are scanned and divided into bricks, and brick parameters are converted into an index into the classification map, to classify document regions by content.

Other aspects, features, and techniques of the invention will be apparent to one skilled in the relevant art in view of the following detailed description of the invention embodiments.

BRIEF DESCRIPTION OF THE DRAWINGS

The features, objects, and advantages of the present invention will become more apparent from the detailed description set forth below when taken in conjunction with the drawings in which like reference characters identify correspondingly throughout. The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is an index to the region map of FIG. 2.

DESCRIPTION OF THE EMBODIMENTS

Figure 1:
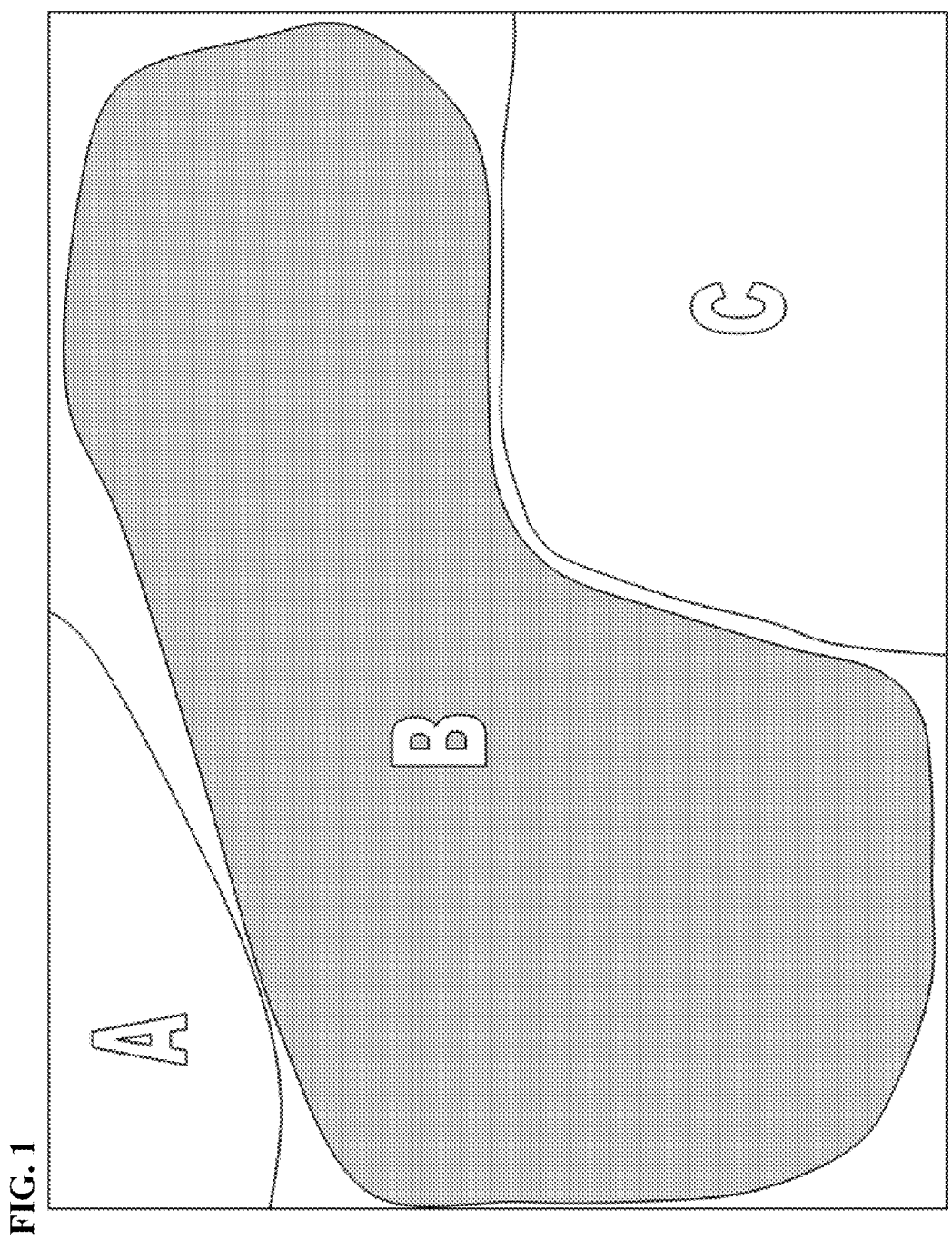
FIG. 1 is a diagram that depicts a simplified two dimensional parameter space containing populations of three different sample types, A, B, and C, according to embodiments of the present invention.

The invention will now be described more fully hereinafter with reference to the accompanying drawings, which form a part thereof, and which show, by way of illustration, specific embodiments by which the invention may be practiced. The invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment in the form of modules or circuits, and entirely software embodiment in the form of software executed on a general purpose microprocessor, an application specific microprocessor processor, a general purpose digital signal processor or an application specific digital signal processor, or an embodiment combining software and hardware aspects. Thus, in the following description, the terms "circuit" and "module" will be used interchangeably to indicate a processing element that executes an operation on an input signal and provides an output signal therefrom regardless of the hardware or software form of its implementation. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. Therefore, "A, B or C" means any of the following: A; B; C; A and B; A and C; B and C; A, B and C. An exception to this definition will occur only when a combination of elements, functions, steps or acts are in some way inherently mutually exclusive. The term "based on" is not exclusive and allows for being based on additional factors not described, unless the context clearly dictates otherwise. In addition, throughout the specification, the meaning of "a", "an", "and" and "the" include plural references. The term "another" is defined as a second or more. The meaning of "in" includes "in" and "on". Also, the use of "including", "comprising", "having", "containing", "involving", and variations thereof herein, is meant to encompass the items listed thereafter and equivalents thereof as well as additional items.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other nonvolatile memory, a floppy diskette, a CD-ROM, an optical disk, a hard disk, etc.

Training

A set of original training documents (or portions thereof) that represent the various kinds of text and images that will be encountered by the copy system is selected by a user and scanned. The scans are preferably made by the scanners to be used in the production copy system, and at the resolutions to be used in the copy system. If more than one resolution exists, the whole tuning process may preferably be duplicated for each resolution. These scans should be kept in an uncompressed format, such as Tagged Image File Format (TIFF), as opposed to a compressed file format, such as JPEG.

A user then classifies various somewhat coarse regions of these documents as consisting of white space, text, and image. This classification may be done by hand or with the aid of tools.

One way to do this is to use the Layers feature of Adobe® PhotoShop® ("Adobe" and "PhotoShop" are registered trademarks of Adobe Systems Incorporated). First, one creates a second layer over the original scanned document. Then one uses big filled rectangles to make that layer green for example where the original is image, red where the original is text, and blue where the original is white. Next, save that second layer as a rough classification of the original document. That rough classification will not be perfect. There will be white space between text characters and between text lines for example. The result is a set of inputs with the desired classifications.

Embodiments of the present invention implement a computer program, called helptag, to adjust the rough hand classification of the original training documents. This program turns the rough hand classification described previously into a high resolution map. It reads the original RGB image and converts each pixel into a luminance, chrominance space like YUV or YCC. Helptag then divides the images into rectangular sets or "bricks" of pixels, and calculates a set of relevant descriptive parameters for each brick. The brick is the basic grouping of pixels that gets classified as text, image or white. One needs to select a brick size to be used. Experimentation has indicated that bricks of 32×1 pixels (i.e. 32 vertical pixels by 1 horizontal pixel) in size work particularly well, although other brick dimensions are within the scope of the invention.

Helptag looks for white bricks in text and white bricks in images. A brick is defined as white if its minimum luminance is above a threshold and its average luminance is above a different threshold. The thresholds may be different for text and images. If the helptag program finds a white space brick, it ORs in the white space classification, e.g. blue color in the classification image described above. A red text brick that could also be white space, turns into a magenta (text or white space) brick in the classification image. A green image brick that also could be white space turns into a cyan (image or white space) brick in the classification image.

Helptag may also look for dark bricks in areas hand tagged as white space. One may use the same minimum luminance and average luminance thresholds as was used in looking for white space bricks in images. Helptag should get rid of the white space classification for these bricks. Helptag should also extend image and text classifications to the edge of the current brick, even if that extends into white space. If part of a brick was hand tagged as text, the whole brick should be tagged as text. The same applies to image bricks.

Special handling is required for the edges of dark images. The edges of dark images are very difficult to differentiate from the edges of large text characters. It is better if these edges are initially classified as text. Secondary processing can reconvert them to images if it sees "white, text, image, image, . . . , image, text, white" sequences. Helptag also looks for dark edges tagged as image and removes the image classification.

There is a similar situation with the interiors of large text characters. The interiors of large text characters are very difficult to differentiate from dark image interiors. It is thus better if these interiors are initially classified as image. Secondary processing can later convert them to images if it sees "text, image, image, text" sequences. Helptag may look for bricks entirely within a text character, and remove the text classification.

Autotuning

A general objective of embodiments of the present invention is to successfully mimic the visual perception and judgment of a human classifier, given the training documents and corresponding classification results, as approximate as they may be. To that end, the embodiments of the present invention implement an autotuner program that further processes the input training documents to establish parameter mappings to be used later as part of an automated segmentation process. The embodiments build a classified brick population map in N-dimensional parameter space, and then use linear algebra to generate a set of linear equations that separate the N-dimensional parameter space along the lines of classification boundaries. N is 12 in one embodiment, although other values are within the scope of the invention. When a future document image is scanned and divided into bricks, the parameter values of those bricks will be used to reach a particular region of parameter space and return a classification value. If the parameters are well chosen, regions with lots of text bricks will not overlap much with regions with lots of image bricks, etc.

Figure 2:
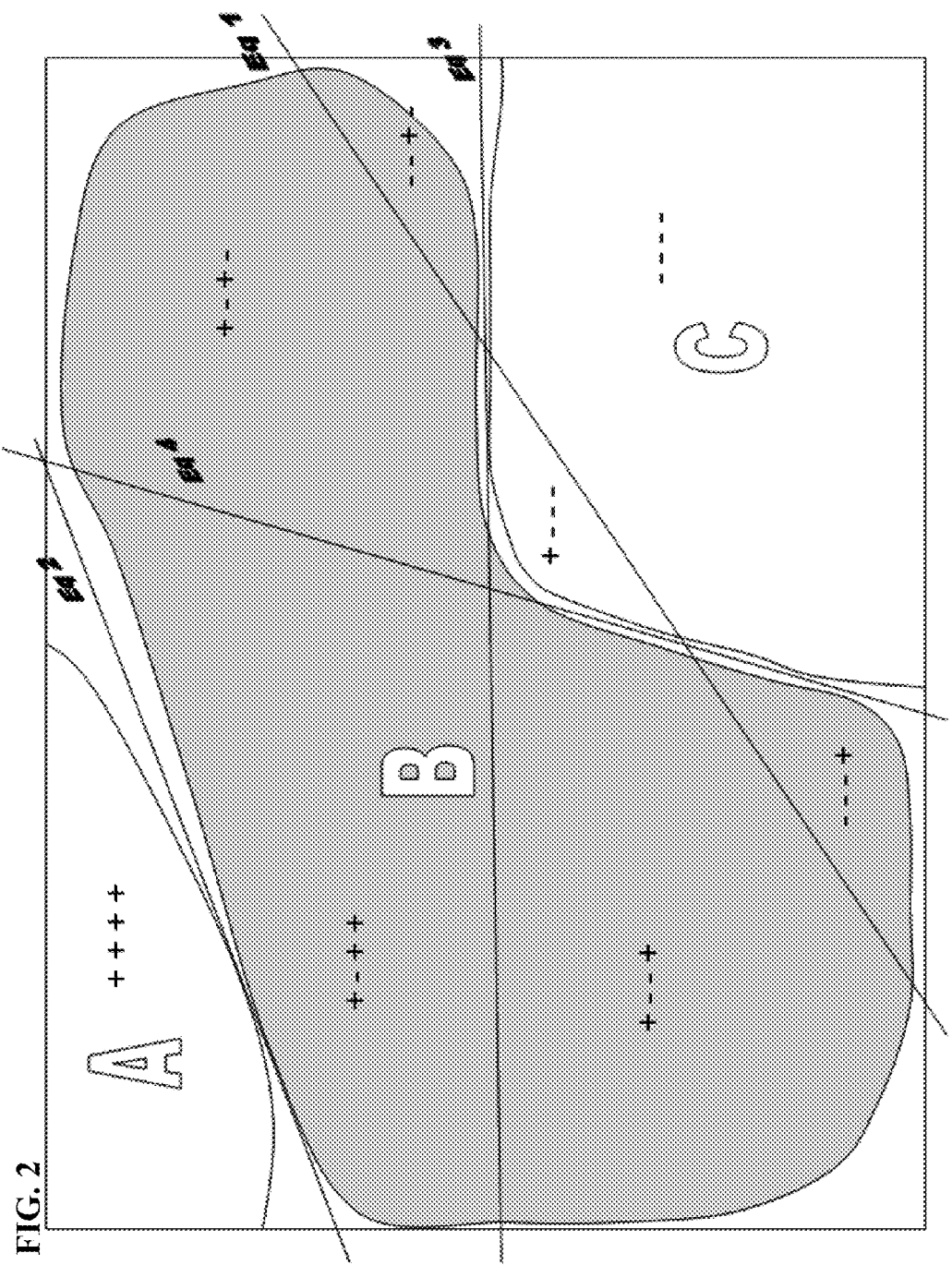
FIG. 2 is a diagram that depicts FIG. 1 following definition of separation equations and cutting hyperplanes, according to embodiments of the present invention.
Figure 3:
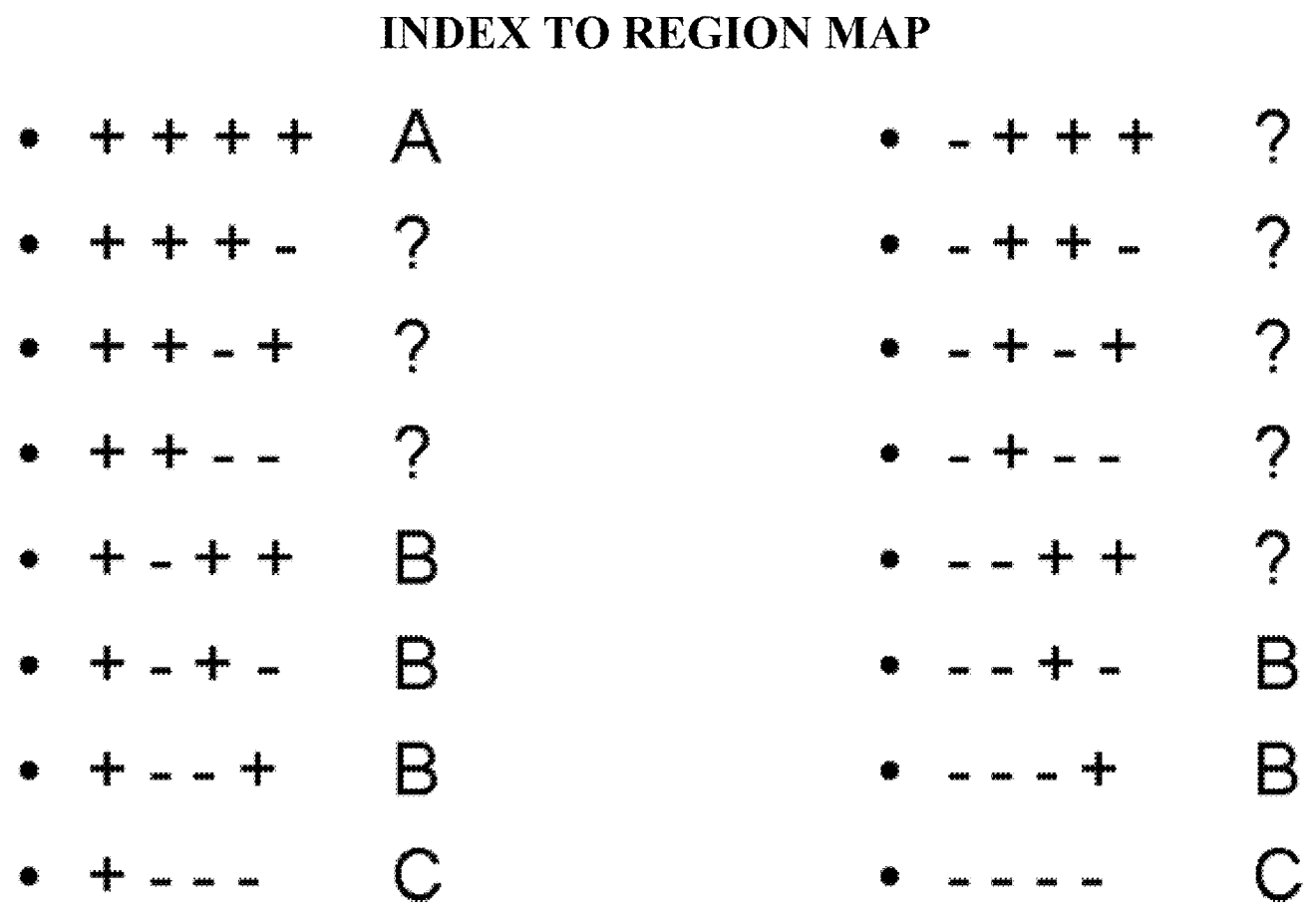

FIG. 1 depicts a simplified two dimensional parameter space containing populations of three different sample types, A, B, and C. The parameter values for each sample brick define a point in this parameter space. The regions marked A, B, and C outline where the A, B, and C type sample bricks are located in this parameter space. In this example there are only two dimensions, indicating two parameters, and the populations are not overlapping. That is not typically the case for populations of text, image, and white samples. However, the diagram is still useful in understanding the tuning process. FIG. 2 depicts the same sample space after four separation equations have been defined. The equations govern the placement of hyperplanes that define regions of parameter space. The plus and minus notations denote the results of evaluations of the separation equations within the various regions of parameter space. These results are concatenated to produce region IDs. FIG. 3 denotes the different region IDs and the different image areas to which they correspond.

Before beginning the autotuning process, one needs the parameter values for each brick in the input documents. If evaluating the efficacy of different parameters or the best number of parameters, a user might want to have a separate program to calculate a parameter file for each input file. The parameter values should all be integers in the same range. For example, experimentation has determined that the parameter value range of 0-255 works well. Thus, the bricks are typically contained in a 12-dimensional hypercube, with 0-255 on each edge.

Further, experimentation has determined that it helps to have a file listing the inputs to the autotuner. For each input image, one needs the input image name, the name of the corresponding classification file from the helptag program, the name of the corresponding brick parameter value file and a weighting factor.

Once the set of original training document images is selected and tagged with the desired (i.e. human) classification, the embodiments of the invention operate automatically. If the embodiments fail to properly classify a certain kind of feature, an example of that feature may be added to the set of original training document images along with its desired or "correct" classification, and the training process may be rerun. Thus the tuner's job now is to merely select a good set of original training documents. The prior art approach of using thresholds to compare with brick parameter values, followed by assembly of various AND & OR logic expressions has been replaced. Each brick instead has an associated set of N parameter values. These parameters locate the brick as a point in N-dimensional parameter space.

A set of M equations for hyperplanes will cut through this N-dimensional parameter space, chopping it into less than 2^M regions. Each region is bordered by a set of hyperplanes. If the hyperplanes are selected well, each region has a preponderance of only one classification of bricks. A region can be defined by whether it falls on the plus or minus side of each of the M equations. Those M plus or minus outcomes can be encoded into an M bit address into a table of classifications. Thus the embodiments implement a run time segmentation algorithm that may be described as "For each brick, plug the parameters for that brick into the M equations, generating a plus or minus answer, concatenate the M sign bits into an M bit address, use the M bit address to access a classification table entry to read the likely classification for this brick." The tuner program generates the M equations and builds the 2^M entry classification table.

Now the autotuner process is ready to start. The autotuner reads the classification tag file and the brick parameter value file and builds a table of brick sample data. The brick sample data should include the desired classification(s), the parameter values for the brick, and the weight of the current image. There should be a bit for each legal classification since more than one classification can be allowed, for example white space or text. There should also be a group ID field so that one may later easily work with subgroups of the sample data.

White Separation

The next step is to generate a test for white space area versus nonwhite area (e.g. text or image) samples. There are parameters for the average luminance in a brick and the minimum luminance in a brick. The white versus nonwhite test depends on only these two parameters. From the brick sample table, the embodiments build two histograms where the independent axis is the average luminance value. One histogram is for bricks classified as white and the other is for bricks classified as nonwhite. The histograms will probably overlap. The embodiments find the point along the average luminance axis where the number of nonwhite histogram entries above the point and the number of white histogram entries below the point are equal. This is the best classification by average luminance, termed bavglum.

The embodiments then perform the same procedure for the minimum luminance parameter, calculating the best classification by minimum luminance, termed bminlum. Using these two values, bavglum and bminlum, the embodiments calculate an equation that separates white from nonwhite in brick parameter space, $0=k_0+w_{01}*bavglum+w_{02}*bminlum$. Weight bminlum twice the weight of bavglum; e.g. $w_{01}=10$ and $w_{02}=20$. Then $k_0=-w_{01}*bavglum-w_{02}*bminlum$. One now has an equation, $0=k_0+w_{01}*Pavglum+w_{02}*Pminlum$, that separates white from nonwhite bricks in parameter space.

In this equation Pavglum and Pminlum represent the average and minimum luminance values of any brick to be tested, respectively. If the expression $k_0+w_{01}*Pavglum+w_{02}*Pminlum$ is positive, the brick is white; otherwise it is nonwhite.

Text Separation

Now the embodiments make the first attempt at separating text from image. The embodiments look through the brick sample table at entries tagged text and entries tagged image. Next, they calculate a center of gravity in N-dimensional parameter space for text and for image. Instead of the usual center of gravity based on averages, one based on median values has been found to be superior. This can again be done with histograms.

Next, the embodiments calculate the slope of a hyperplane that splits these two populations. It will be perpendicular to the N-dimensional vector between the two centers of gravity. It will have the form $0=k_1+v_{11}*p_1+v_{12}*p_2+\ldots+v_{1N}*p_N$, where $v_{11}$ through $v_{1N}$ are the N components of the vector between the population centers. The $v_{11}$ through $v_{1N}$ provide a slope. A value for $k_1$ should be chosen such that the number of misclassified text bricks matches the number of misclassified image bricks. This amounts to sliding the separation plane along the vector between the two centers until the text errors match the image errors. This can be done by calculating $k_{1t}$ for the text center of gravity and $k_{1i}$ for the image center of gravity. Divide the range, $-k1t$ to $-k1i$, into a large enough number of buckets, and calculate two histograms over the buckets, one for text and one for image. Calculate the expression, $v_{11}*p_1+v_{12}*p_2+\ldots+v_{1N}*p_N$, and increment the count in the appropriate text or image bucket. There is probably some overlap in the histograms. Find the entry where the text errors match the image errors. That defines the $k_1$ value to use.

Improving Classification

If the white, text and image brick sample populations in N-dimensional parameter space were well segregated and separated along linear boundaries, the two equations would be all that was required. However, neither of those conditions is true. The populations intermingle and the best boundaries are not linear. The embodiments of the present invention attacks the latter problem by adding more hyperplanes that further subdivide the N-dimensional parameter space. The multiple hyperplanes provide a piecewise approximation to a curved boundary. Because of the first problem, intermingling, however, one can never achieve a perfect classification algorithm.

The next problem is, "How does one select the best hyperplanes to split the N-dimensional parameter space into the most nearly segregated regions?" The autotuner program uses a recursive algorithm to select hyperplanes. At each stage the embodiments have E current hyperplane equations. These split the N dimensional parameter space into at most $2^E$ regions. The program builds a classification table for these regions. There is an entry for each region. The entry should have the number of sample bricks in this region that are text, image and white, the most numerous tag, the number of text, image and white bricks wrongly tagged, and the second most numerous tag. The program loops over the sample bricks, uses the E current hyperplane equations with the brick's parameter values to calculate E sign bits, combines those E sign bits into an index into the per region classification table and updates the text, image or white count for this entry. Then for each region it picks the most numerous tag and the second most numerous tag. The second most numerous tag is counted as misclassification. Then the program looks through the regional classification table and finds the regions with the highest number of misclassifications. For each of these it uses the above described algorithm to calculate a hyperplane that would split that region into more segregated populations. For this calculation it uses only the samples in this region. This is a candidate next hyperplane.

To evaluate this candidate it rebuilds the regional classification table, but now with E+1 equations. Then it looks at the total number of misclassifications over all regions. It looks at this total because a new hyperplane will likely split many regions, some in beneficial ways. The candidate with the least total errors becomes the next hyperplane. This recursive process continues until there are as many equations as there is space and time available. There are also diminishing returns; successive hyperplane equations correct fewer and fewer misclassifications.

This tuning process takes place offline. The results of the process are a set of coefficients and offsets for E equations and a table of $2^E$ two bit entries in a classification table. The entries encode text, image, and white space. There may be a set of equations and a classification table for each scan resolution.

Experimentation has determined that 16 equations is a good tradeoff between accuracy and time and space constraints. A digital signal processor was used that can do 16 8-bit multiply accumulates per clock cycle. The calculation and accumulation of the brick parameters typically takes more time than the equation evaluation and table lookup.

Two basic brick parameters were added for each brick. The first is a measure of the amount of light to dark to light transition in a running vertical average of the luminance of the pixels. For each column of pixels across the page, a running average of the luminance is calculated as the sum of seven times the previous running average for this column plus the luminance of this pixel, all divided by eight. Within each brick, going across the pixels from left to right, the embodiments track the following values, the lightest running average, the biggest drop in luminance from that lightest running average, the level of running average luminance at that biggest drop called darkest, the biggest rise in running average luminance from that darkest, and the max product of biggest drop and biggest rise. Within each brick, that max product, divided by 128 and limited to 255 is the first new parameter, light to dark to light.

Note that the true average of pixels from a few lines above to a few lines below a given pixel would give a better average than this running average. However, it would be much more computationally expensive, and experimentation has determined that this present method is adequate. Since one is working with just a current running average and a new pixel at the bottom of the averaging window, the running average calculated applies to a pixel five lines previous to the new pixel being added. Thus the light to dark to light parameter applies to a brick five lines previous to the new pixels.

The second new parameter is a measure of the sum of the absolute value of the difference between the luminance of a pixel and the luminance run through a 2D low pass filter. To save computation time, the 2D low pass filter is approximated by a running horizontal average of the running vertical averages for each column of pixels. The new 2D average is computed as the sum of seven times the current 2D average plus the new vertical average, all divided by 8. This 2D average applies to a pixel five columns previous to the new column. The embodiments calculate the difference between this 2D average luminance and the luminance of the pixel it applies to, getting the absolute value of that difference. Then those absolute values are summed across the brick and the sum is divided by eight. That is the second new parameter.

Embodiments of the present invention enable much easier calibration and yield much more accurate segmentation classification results than has been possible with the prior art. The embodiments also render the tuning of a segmentation system for a given scanner model or a different type of original document a more practical task. The embodiments provide higher quality copies, which may sometimes be printed at higher speeds. The embodiments may also be applied to Mixed Raster Content (MRC) documents, which are highly compressible document scans typically containing both binary text and continuous-tone images.

The automatic tuner portion of the embodiments has much broader application than just text, image, white segmentation. It would be useful anytime one had parametric data describing objects or items to be classified by a computer, and a training set of previously classified items.

A document copy pipeline may be summarized as follows:
Scan original documents
Perform white point compensation or background removal
Convert from RGB to YCC representation
Perform primary segmentation to generate segmentation plane
Perform secondary segmentation to adjust segmentation plane
Limited sharp Y to generate text plane
FIR filter Y
Color convert YCC to CMYK representation
Scale all planes, CMYK+text+segmentation
Screen text plane with 1-bit error diffusion
Screen CMYK with 2-bit clustered dot error diffusion
Merge CMYK planes with text plane according to segmentation plane
Print CMYK output The segmentation tuning process may be summarized as follows:
Select input samples that represent the range of text and images to be processed
Scan those samples on the target scanner
Hand tag those samples via PhotoShop® layers creating a parallel image that for example is red where the sample is text, green where the sample is image, and blue where the sample is white space
Refine the hand tags using a helper program
Calculate the parameters for the bricks in the samples
Use the autotuner program to generate a classification map that maps parameter values to classification codes
Build the classification map into the runtime code for production runs
Adjust the tuning process if necessary by adding input samples and rerunning the relatively automated training process Each region of parameter space may be classified with the following data entries:
Number of samples not tagged text
Number of samples not tagged image
Number of samples not tagged white
Least erroneous tag
Number of text bricks wrongly in this region
Number of image bricks wrongly in this region
Number of white bricks wrongly in this region
Dominant wrong tag in this region
Total wrong tags in this region The autotuner algorithm may be summarized as follows:
Generate equations to separate white space from text or image
Generate equations to separate text from image
Loop through the following process until there are sufficient equations:
Fill out the region classification table
Find the N worst regions by total wrong tags
Generate separation equations for each of these regions using only the populations in that region
Evaluate each one by filling out the new larger region classification table and count total errors over all samples
Pick the one with the fewest total errors
Add that separation equation to the set The process for generating separation equations may be summarized as:
Find the centers of gravity of the two populations. Instead of the usual center of gravity based on averages, use one based on median values.
The hyperplane slope will be perpendicular to the vector between the centers of gravity. Thus $w0 \ldots w11=v0 \ldots v11$.
Calculate a kA such that the hyperplane passes through the population A center of gravity. $kA=-(w0*p0A+w1*p1A+\ldots+w11*p11A)$
Similarly calculate a kB such that the hyperplane passes through the population B center of gravity
Divide the range kA to kB into a large enough number of buckets and calculate two histograms over the buckets, one for population A and one for population B.
Evaluate $-(w0*p0+w1*p1+\ldots+w11*p11)$ for each of the two populations and increment the appropriate histogram bucket.
There will probably be some overlap between the histograms.
Working in from both ends of the histograms, find the entry where the accumulated population A errors most closely match the accumulated population B errors.
That entry defines the K value for the equation.

The segmentation parameters may include:
Sri Smoothness
Maximum Color
Average Luminance
Minimum Luminance
Maximum Luminance
Averaged Sri Smoothness
Neighborhood Minimum Luminance
Vertically Averaged Maximum Color
General (Average) Color
Vertically Averaged General Color
Darkest in Lightest
High Pass-Low Pass Luminance Filter The Sri Smoothness parameter may be defined as: $(sum(abs(pixel\ luminance\ gradient)))^2/sum((pixel\ luminance\ gradient)^2)$, where the pixel luminance gradient is the pixel-to-pixel delta luminance. This parameter will be low in text, but high in photos and halftones.

The Maximum Color parameter may be defined as:
Distance from neutral in YCaCb space
Reduced by previous line to next line luminance change—compensates for color fringe on text
$Max(0, abs(sum(4\ pixel\ Ca\ color)-4*128)+abs(sum(4\ pixel\ Cb\ color)-4*128)-abs(sum(4\ prev\ line\ Y)-sum(4\ next\ line\ Y))/4)$
Calculated for 4 pixels at a time (this is fast on DSP)
Pick max of 8 groups of 4

The Averaged Sri Smoothness parameter may be defined as:
  Vertically and then horizontally averaged
  New vertical running average=(old vertical running average*7+new value)/8
  Horizontal average is (left vert avg+2*this vert avg+right vert avg)/4
The Neighborhood Minimum Luminance parameter may be defined as:
  Find minimum luminance in the neighborhood of this 32×1 pixel brick
  Look 5 lines back, 2 lines back, this line, 2 lines ahead, 5 lines ahead
  On each line consider this brick, previous brick, and next brick horizontally
The Vertically Averaged Maximum Color parameter may be defined as:
  Calculated from Maximum Color parameter
  Use parameters from this brick and bricks above and below
  Max color above+2*this max color+max color below)/4
The General (Average) Color parameter may be defined as:
  Max(0, abs(sum(4 pixel Ca color)−4*128)+abs(sum(4 pixel Cb color)−4*128)−abs(sum(4 prev line Y)−sum(4 next line Y))/4)
  Start with same calculation as Max Color
  Average over 8 groups of 4 pixels
The Vertically Averaged General Color parameter may be defined as:
  Start with General (Average) Color
  Calculate a running vertical average
  Next value=(previous value*7+new value)/8
The Darkest in Lightest parameter may be defined as:
  Keep a running vertical average of luminance for each pixel position across page
  Vavglum=(previous vavglum*7+new luminance)/8
  Processing pixels from left to right in a brick, looking at vavglum values, track lightest pixel, darkest pixel, max light to dark delta (lddelta), max dark to light delta (dldelta), max product of lddelta and dldelta
  Darkest in Lightest=min(max product/128, 255)
The High Pass-Low Pass Luminance Filter parameter may be defined as:
  Sum (abs (high −2D low pass filter))
  Calculate a running horizontal average of the running vertical average luminance. This provides the 2D low pass filter.
  Use the pixel luminance itself for the high pass filter.
  This integrates the sharp edges in the text.

What is claimed is:

1. A method for processing an image region of an image having a plurality of pixels, comprising:
  dividing the image region into a plurality of bricks of pixels;
  calculating parameters of each of the plurality of bricks;
  applying in a computer system the calculated parameters of each brick to a plurality of brick parameter separation equations to obtain a result for each of the plurality of brick parameter separation equations;
  computing an index for each brick by concatenating the brick parameter separation equation results for that brick;
  performing a classification map lookup using the index; and
  classifying the brick as representing white space, black text, or image content according to the result of the classification map lookup; whereby
  the image region is segmented into sub-regions of white space, black text, and image content according to the classification of said bricks.

2. The method of claim 1, wherein the classification map is created by prior processing of at least one training image.

3. The method of claim 1, wherein the classification map relates the parameters to classified content type.

4. The method of claim 1, wherein the brick parameter separation equations define hyperplanes cutting a parameter space into parameter regions having different combinations of parameter values.

5. The method of claim 1, wherein hyperplanes defined by the brick parameter separation equations cut a parameter space into parameter regions approximating an optimal mapping between parameter value combinations and corresponding image region classifications.

6. A system for processing an image region of an image having a plurality of pixels, comprising:
  a processor that:
  divides the image region into a plurality of bricks of pixels;
  calculates parameters of the plurality of bricks;
  applies the calculated parameters of each brick to a plurality of brick parameter separation equations to obtain a result for each of the plurality of brick parameter separation equations;
  computes an index for each brick by concatenating the brick parameter separation equation evaluation results for that brick];
  performs a classification map lookup using the index; and
  classifies the brick as representing white space, black text, or image content according to the result of the classification map lookup; whereby
  the image region is segmented into sub-regions of white space, black text, and image content according to the classification of said bricks.

7. The system of claim 6, wherein the classification map is created by prior processing of at least one training image.

8. The system of claim 6, wherein the classification map relates the parameters to classified content type.

9. The system of claim 6, wherein the brick parameter separation equations define hyperplanes cutting a parameter space into parameter regions having different combinations of parameter values.

10. The system of claim 6, wherein hyperplanes defined by the brick parameter separation equations cut a parameter space into parameter regions approximating an optimal mapping between parameter value combinations and corresponding image region classifications.

11. A non-transitory machine-readable medium embodying a computer program product for processing an image region of an image having a plurality of pixels, the non-transitory machine-readable medium comprising non-transitory program instructions that, when executed by a computer, cause the computer to:
  divide the image region into a plurality of bricks of pixels;
  calculate parameters of the plurality of bricks;
  apply the calculated parameters of each brick to a plurality of brick parameter separation equations to obtain a result for each of the plurality of brick parameter separation equations;
  compute an index for each brick by concatenating the brick parameter separation equation evaluation results for that brick;
  perform a classification map lookup using the index; and
  classify the brick as representing white space, black text, or image content according to the result of the classification map lookup; whereby the image region is segmented into sub-regions of white space, black text, and image content according to the classification of said bricks.

12. The non-transitory machine-readable medium of claim 11, wherein the classification map is created by prior processing of at least one training image.

13. The non-transitory machine-readable medium of claim 11, wherein the classification map relates the parameters to classified content type.

14. The non-transitory machine-readable medium of claim 11, wherein the brick parameter separation equations define hyperplanes cutting a parameter space into parameter regions having different combinations of parameter values.

15. The non-transitory machine-readable medium of claim 11, wherein hyperplanes defined by the brick parameter separation equations cut a parameter space into parameter regions approximating an optimal mapping between parameter value combinations and corresponding image region classifications.

16. The non-transitory machine-readable medium of claim 11, wherein the processing is performed for at least one of: document copying, document printing, and document compression.

17. A system for processing at least one image region of an image having a plurality of pixels, comprising means for:
dividing the image region into a plurality of bricks of pixels;
calculating parameters of each of the plurality of bricks;
applying in a computer system the calculated parameters of each brick to a plurality of brick parameter separation equations to obtain a result for each of the plurality of brick parameter separation equations;
computing an index for each brick by concatenating the brick parameter separation equation results for that brick;
performing a classification map lookup using the index; and
classifying the brick as representing white space, black text, or image content according to the result of the classification map lookup; whereby
the image region is segmented into sub-regions of white space, black text, and image content according to the classification of said bricks.

* * * * *